(12) United States Patent
Wheeler et al.

(10) Patent No.: US 9,067,669 B2
(45) Date of Patent: Jun. 30, 2015

(54) CARBON FIBER HOLD OPEN ROD

(75) Inventors: Ryan A. Wheeler, Waco, TX (US); Julio Palma, Waco, TX (US)

(73) Assignee: MarathonNorco Aerospace, Inc., Waco, TX (US)

(*) Notice: Subject to any disclaimer, the term of this patent is extended or adjusted under 35 U.S.C. 154(b) by 189 days.

(21) Appl. No.: 13/323,355

(22) Filed: Dec. 12, 2011

(65) Prior Publication Data

US 2013/0145579 A1 Jun. 13, 2013

(51) Int. Cl.
*B64C 1/06* (2006.01)
*E05C 17/04* (2006.01)

(52) U.S. Cl.
CPC .............. *B64C 1/06* (2013.01); *Y10T 29/49959* (2015.01); *Y10T 16/61* (2015.01); *Y10T 29/49826* (2015.01); *E05C 17/04* (2013.01)

(58) Field of Classification Search
CPC ........... B64C 1/06; E05C 17/04; E05C 17/12; E05C 17/30; Y10T 16/61; Y10T 29/49826; Y10T 29/49959; E04G 25/06
USPC .................. 16/82; 29/428, 525.05; 244/53 R; 248/351, 354.1, 354.3
See application file for complete search history.

(56) References Cited

U.S. PATENT DOCUMENTS

| | | | | |
|---|---|---|---|---|
| 4,395,070 A * | 7/1983 | Veltman et al. | ............ | 296/97.22 |
| 4,629,146 A * | 12/1986 | Lymons | ...................... | 244/53 R |
| 4,819,300 A * | 4/1989 | Jackson | ......................... | 16/327 |
| 5,535,861 A * | 7/1996 | Young | ........................... | 188/381 |
| 5,836,564 A * | 11/1998 | Duran | ........................ | 248/354.5 |
| 6,904,643 B2 * | 6/2005 | Duffy | ............................... | 16/83 |
| 7,357,354 B2 * | 4/2008 | Mortland | ................... | 244/129.5 |
| 7,654,371 B1 * | 2/2010 | Metz et al. | ..................... | 188/300 |
| 7,882,941 B2 * | 2/2011 | Rozema | ........................ | 188/293 |
| 2009/0300877 A1 * | 12/2009 | Wood et al. | ........................ | 16/71 |
| 2010/0024161 A1 * | 2/2010 | Wood et al. | ....................... | 16/82 |
| 2010/0307872 A1 * | 12/2010 | Wheeler et al. | ................. | 188/67 |
| 2013/0146736 A1 * | 6/2013 | Wheeler et al. | ............ | 248/354.1 |
| 2013/0175419 A1 * | 7/2013 | Wheeler et al. | ............. | 248/354.1 |
| 2013/0206955 A1 * | 8/2013 | Palma et al. | .................. | 248/602 |

* cited by examiner

*Primary Examiner* — William Miller
(74) *Attorney, Agent, or Firm* — Baker & Hostetler LLP

(57) ABSTRACT

A hold open rod system is provided. The system may include, a cylindrical bracket having a first portion with a first bore for coupling to an elongate tensile member and a second portion remote from the first portion, having a second bore for coupling to a fastener; and a tubular jacket surrounding the at least a portion of the bracket, the elongate tensile member and at least a portion of the fastener. A method of constructing a hold open rod may be provided. The method may include: attaching a bracket to an end of a composite tube; attaching the composite material to an elongate tension member; operatively connecting a fastener to the elongate tension member; and extending the elongate tension member through at least part of the bracket.

10 Claims, 4 Drawing Sheets

CARBON FIBER HOLD OPEN ROD

FIELD OF THE INVENTION

The present invention relates generally to aircraft door or hatch hold open rods. More particularly, the present invention relates to an apparatus for a light weight hold open rod.

BACKGROUND OF THE INVENTION

Hold open rods are well known in the aviation industry. Hold open rods hold open a door after being opened manually or automatically. They can support a considerable amount of weight. It is desired that the rods function correctly and do not malfunction in supporting the weight they are designed to support.

Generally the rods include two cylindrical telescoping tubes, a first tube disposed inside a second tube. In the resting position, the inner tube is generally located almost entirely within the outer tube. The inner tube can be extended to a designated position to hold open the door. At this extended position, the tubes are locked in place, holding open the door for a period of time. For such applications as the aviation industry where weight and rising fuel costs are a concern, it is desired to provide a hold open rod that is light weight yet still capable of supporting large loads.

It has been known to provide a lightweight member formed of a light weight metal and a light weight composite material. However, in these instances, an epoxy is required to couple the metal and the composite material. If conventional wisdom is applied to a hold open rod, it would result in a situation where the rod's strength and structural integrity are dependent on the epoxy. Accordingly, it is desirable to provide a hold open rod that avoids the use of epoxy for load bearing applications, is light weight, and provides the strength and structural integrity required.

SUMMARY OF THE INVENTION

The foregoing needs are met, to a great extent, by the present invention, wherein in one aspect an apparatus is provided that in some embodiments is a hold open rod that is lightweight, has strength and structural integrity, is capable of supporting substantial loads and avoids the use of epoxy for load bearing applications.

In accordance with one embodiment of the present invention, a hold open rod system is provided. The system may include, a cylindrical bracket having a first portion with a first bore for coupling to an elongate tensile member and a second portion remote from the first portion, having a second bore for coupling to a fastener; and a tubular jacket surrounding the at least a portion of the bracket, the elongate tensile member and at least a portion of the fastener.

In accordance with another embodiment of the present invention, a method of constructing a hold open rod may be provided. The method may include: attaching a bracket to an end of a composite tube; attaching the composite material to an elongate tension member; operatively connecting a fastener to the elongate tension member; and extending the elongate tension member through at least part of the bracket.

In accordance with yet another embodiment of the present invention, a hold open rod system may be provided. The hold open rod system may include: a tubular bracket having a through bore; a rod extending through the bore in the tubular bracket and configured to attach to a fastener; and a tubular jacket enclosing the bracket and the rod.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
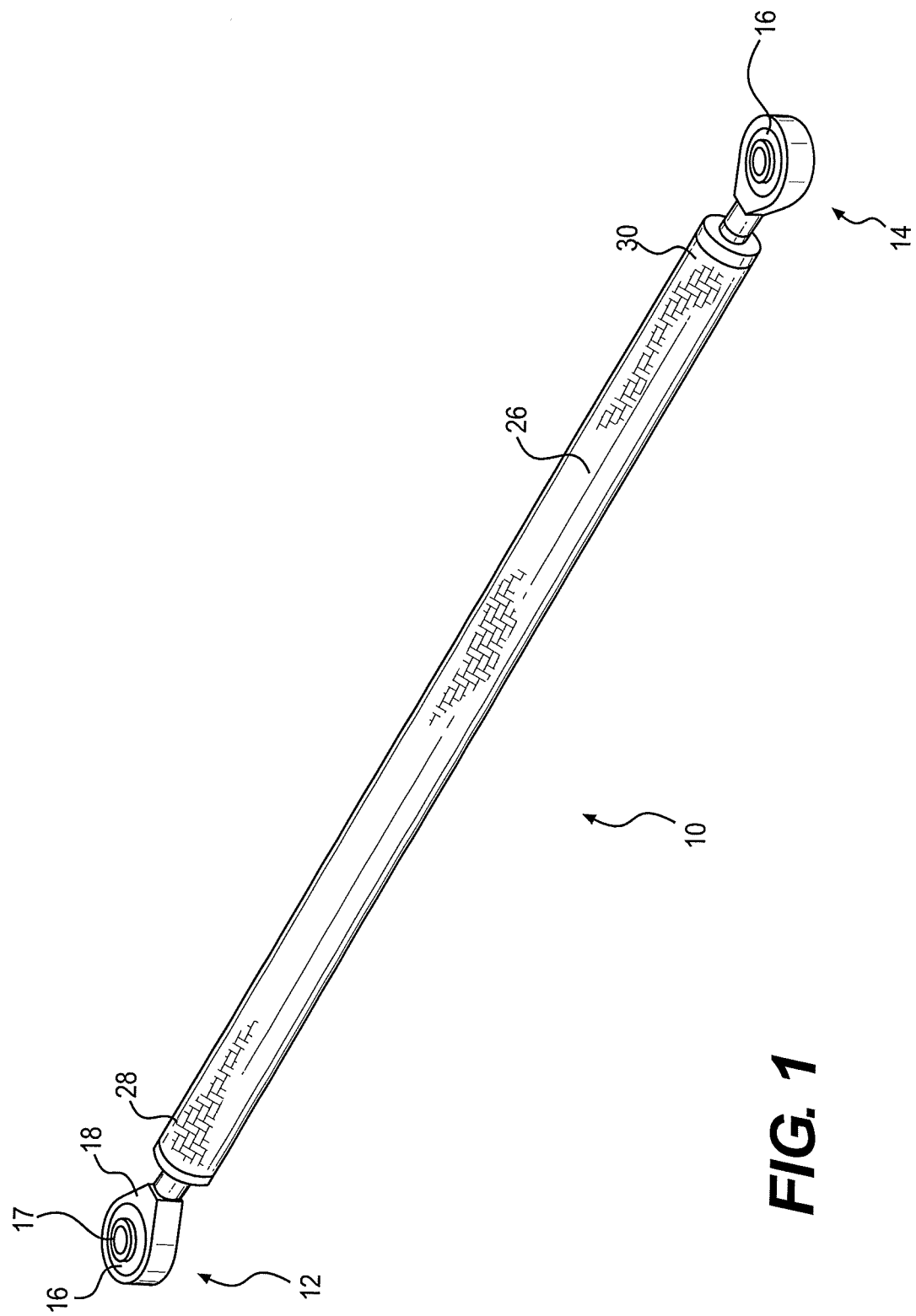
FIG. 1 is a perspective view of a hold open rod system according to an embodiment of the present invention.

Embodiments in accordance with the invention will now be described with reference to the drawing figures, in which like reference numerals refer to like parts throughout. An embodiment in accordance with the present invention provides an apparatus that in some embodiments is a hold open rod that is lightweight, has strength and structural integrity, is capable of supporting substantial loads and avoids the use of epoxy for bearing loads.

Figure 2:
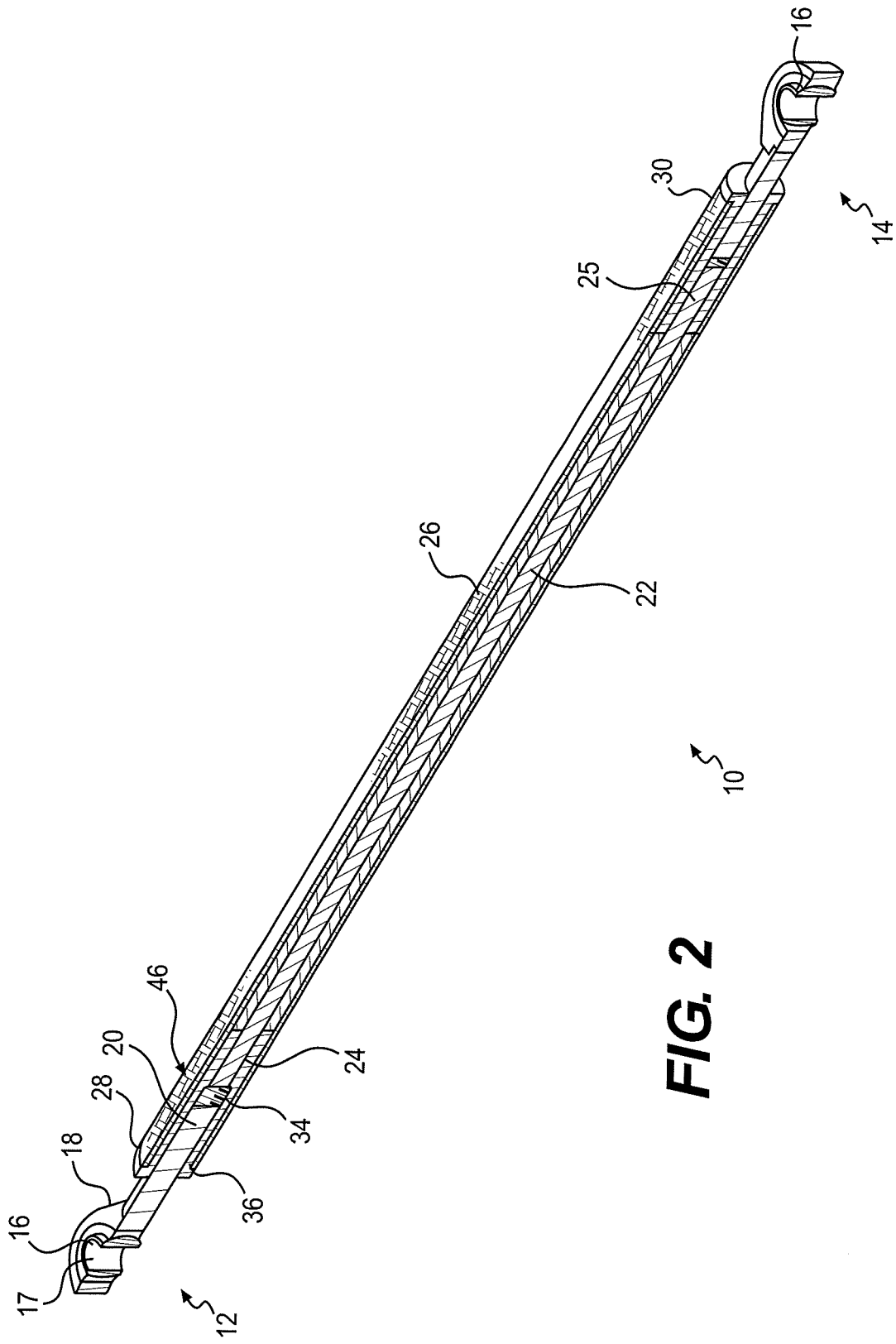
FIG. 2 is a perspective cross sectional view of the hold open rod system of FIG. 1.
Figure 3:
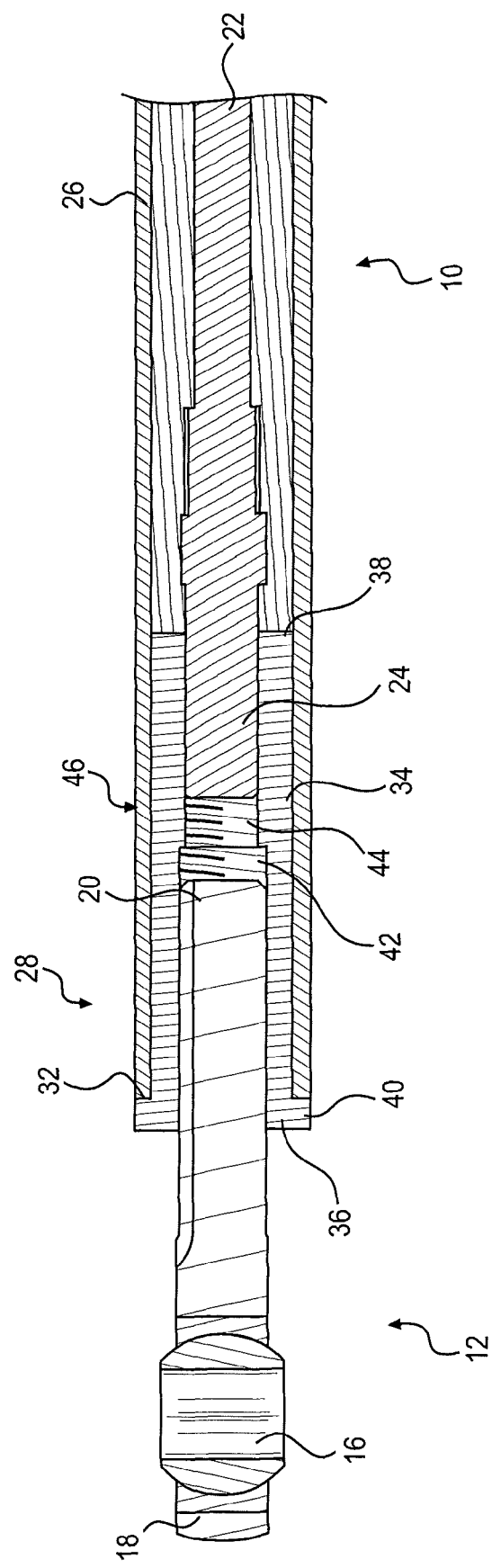
FIG. 3 is a partial cross sectional view of one end of a hold open rod system of in accordance with one embodiment of the present invention.

With reference to FIGS. 1-3, a hold open rod system 10 is shown, according to an embodiment of the present invention. The system 10 has a first end 12 and a second end 14 remote therefrom. Although one end will be referenced in this discussion and depicted in FIGS. 3 and 4, both ends may be identical or mirror images of each other. The first end 12 of the rod system 10 further includes a fastener 16. The fastener 16 can be any type of fastener or the like, configured to couple to the final application, for example, an airplane door or hatch. The fastener 16 has a first fastener end 18 that couples to the airplane door, for example, and a second fastener end 20 that will be coupled to the rod system 10 as will be described herein. The fastener 16 may include a hole 17 to provide structure for coupling to the final application.

In one embodiment, as shown in FIGS. 2 and 3, the rod system 10 further includes a cable 22 coupled to the second fastener end 20 of the fastener 16. The cable 22 has a first end 24 and a second end 25 remote from the first end 24. It is noted that the second end 25 of the cable 22 has a similar configuration to the first end 24.

Radially surrounding the cable 22 and the second fastener end 20 is a tube 26. The tube 26 may be formed of a lightweight, composite material, such as for example, carbon fiber. The tube 26 includes a tube first end 28 and a tube second end 30. The tube first end 28 has a tube face 32 defined by a circumferential edge of the tube 26.

Facilitating the connection of the tube 26 to the fastener 16 is a bracket 34. The bracket 34 has a generally cylindrical geometry with a bracket first end 36 and a bracket second end 38. The bracket first end 36 has a bracket lip 40 that extends radially outward and attaches with the tube face 32. The attaching may be done by a press fit, with threads, other mechanical fasteners or with an adhesive. Any suitable means for attaching the tube 26 to the fastener may be used.

Further, the bracket 34 includes a bracket first bore 42 for receiving and coupling with the fastener 16, specifically the second fastener end 20. The bracket 34 may have a second bore 44 for receiving and coupling with the cable 22, specifically the cable first end 24. Thus, the manner of connecting the cable 22 to the fastener 16, defines a junction 46. The bracket first and second bores 42, 44, respectively can be threaded along with the cable 22 and the fastener second end 20 to couple to the fastener 16 and cable 22. In other embodiments a single bore of a common bore dimension may be used. Other methods of coupling the fastener 16 and cable 22 to the bracket 34 may also be utilized and is within the scope of this invention. For example press fitting rather than threads may be used. Other suitable attaching methods may also be used.

The first and second bores 42, 44 are dimensioned to accommodate the diameters of the fastener 16 and cable 22, respectively. Although the first and second bores 42, 44, respectively, are shown adjacent each other, the bores may be formed apart, defining a solid piece between the bores. Thus, the bracket 34 may be a solid cylinder with a bore at either end for coupling to the fastener 16 and the cable 22.

Thus, in this embodiment, the junction 46 is located inside the tube 26. For example, the cable 22 is held entirely within the tube 26 such that the cable first end 24 is retained within the tube 26 in a longitudinal direction. Further, the second fastener end 20 is also retained within the tube 26 in a longitudinal direction.

The cable 22 may extend through the inside of the tube 26 holding the two brackets 34 (one at each end 28, 20 of the tube 26) in tension against each face 32 of the tube 26. The brackets 34 then attach to the fasteners 16 that then interact with the final equipment, such as an aircraft door.

While the embodiment shown and discussed in FIGS. 1-3 describe a cable 22, other elongated members capable of bearing tensile force may also be used. For example, rods may also be used.

Figure 4:
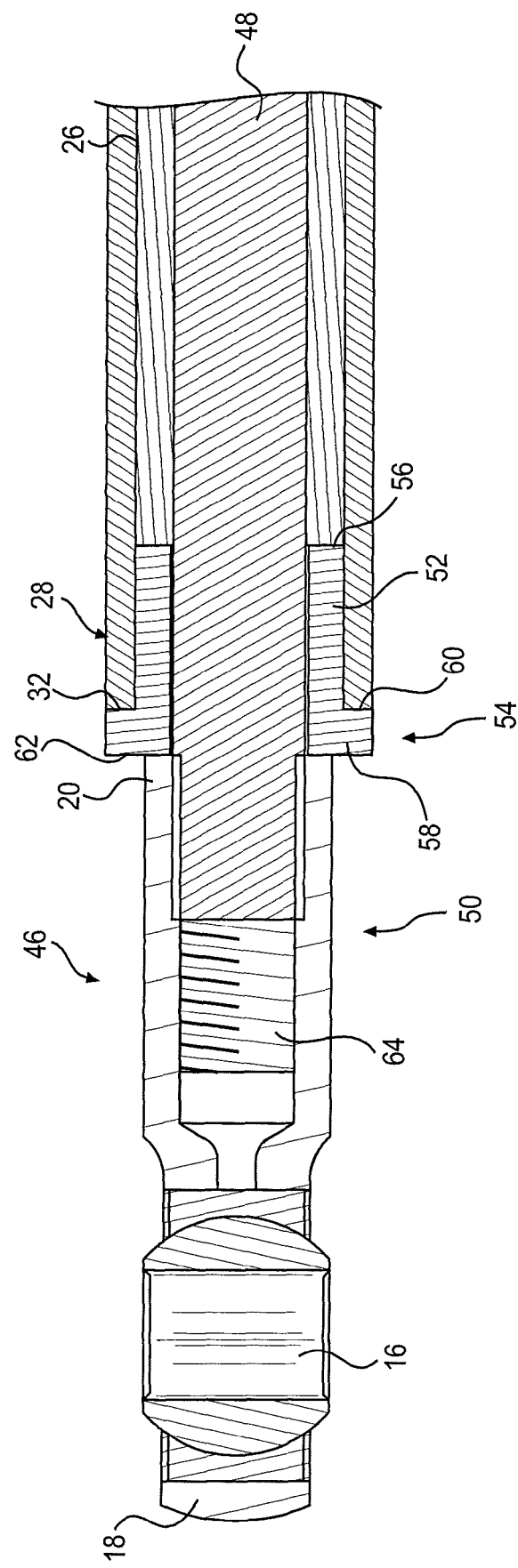
FIG. 4 is a partial cross sectional view of one end of a hold open rod system according to another embodiment of the present invention.

In another embodiment is shown in FIG. 4. Identical reference numbers have been included for similar components. In this embodiment, the junction 46 is located external to the tube 26, as will be further described. Further, in place of the cable 22 in the earlier described embodiment, a rod 48 is provided. The rod 48 has a rod first end 50 and a rod second end remote therefrom (not shown) but is an exact copy or mirror image of the first top end 50.

A bracket 52 in this embodiment has a first end 54 and a second end 56 remote therefrom. A bracket lip 58 extends radially outward and attaches to the tube face 32 at a first lip face 60 and also attaches to the second fastener end 20 at a second lip face 62. The bracket 52 is a generally tubular structure with a through hole disposed at its center for allowing the rod 48 to pass therethrough.

The rod 48 extends into a bore 64 in the fastener 16. The bore 64 may be threaded and attaches to threads in the rod 48.

In this embodiment, the rod 58 couples directly with the fastener 16 and the mating junction 46 is located external to the tube 26. Also, in this embodiment, the fastener 16 is wholly external to the tube 26 and a portion of the rod 48 is external to the tube 26, in a longitudinal direction. The rod 48 and the fastener 16 are shown in this embodiment threadably coupled together. However, they may be coupled in any known fashion, such as by press fit or the like.

In both embodiments described above, the tube 26 does not rely on an epoxy or adhesive to couple to the fastener 16. The fastener 16 and brackets 34, 52 can be formed of various light weight materials, such as aluminum alloy, or other materials such as stainless steel and the like. These configurations allow the tube 26 to take any loads applied to the cable 22 or rod 48 in compression. The tension loads are taken by the cable 22 or rod 48. In the case where the rod 48 is utilized, the rod 48 may also support some of the compressive load as well as the tension load.

The embodiments of the present invention provide a lightweight hold open rod system that utilizes composite material tubes coupled to metal fasteners without the need for adhesives or epoxies.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A hold open rod system, comprising:
   a first fastener;
   a second fastener;
   an elongate tensile member;
   a first cylindrical bracket having a first portion with a first bore coupling to the elongate tensile member and a second portion remote from the first portion, having a second bore coupling to the first fastener;
   a second cylindrical bracket having a first portion with a first bore f-GF coupling to the elongate tensile member and a second portion remote from the first portion, having a second bore coupling to the second fastener; and
   a tubular jacket surrounding at least a portion of the first cylindrical bracket, the second cylindrical bracket, the elongate tensile member, at least a portion of the first fastener, and at least a portion of the second fastener;
   wherein the jacket is formed of a composite material.

2. The system of claim 1, wherein the composite material is carbon fiber.

3. The system of claim 1, wherein elongate tensile member is threadably coupled to the first bores.

4. The system of claim 1, wherein the fasteners are threadably coupled to the respective second bore.

5. The system of claim 1, wherein the elongate tensile member is a cable.

6. The system of claim 1, wherein the elongate tensile member is a rod.

7. The system of claim 1, wherein the first and second bores have different diameters.

8. A hold open rod system, comprising:
a fastener;
an elongate tensile member;
a cylindrical bracket having a first portion with a first bore f-e-F coupling to the elongate tensile member and a second portion remote from the first portion, having a second bore coupling to the fastener;
the cylindrical bracket having a first outer diameter portion and a second larger diameter outer portion; and
a tubular jacket surrounding the first outer diameter portion including at least a portion of the bracket, the elongate tensile member and at least a portion of the fastener;
the second larger diameter outer portion of the cylindrical bracket contacting an outer end face of the tubular jacket and extending away from the tubular jacket;
a second fastener;
a second cylindrical bracket having a first portion with a first bore coupling to the elongate tensile member and a second portion remote from the first portion, having a second bore coupling to the second fastener;
the second cylindrical bracket having a first outer diameter portion and a second larger diameter outer portion;
the tubular jacket surrounding the first outer diameter portion including at least a portion of the second cylindrical bracket, the elongate tensile member and at least a portion of the second fastener; and
the second larger diameter outer portion of the second cylindrical bracket contacting an outer end face of the tubular jacket and extending away from the tubular jacket.

9. The system of claim 8, wherein the tubular jacket is formed of a composite material.

10. The system of claim 9, wherein the composite material is carbon fiber.

* * * * *